(12) United States Patent
Wang et al.

(10) Patent No.: US 8,379,120 B2
(45) Date of Patent: Feb. 19, 2013

(54) IMAGE DEBLURRING USING A COMBINED DIFFERENTIAL IMAGE

(75) Inventors: Sen Wang, Rochester, NY (US); Tingbo Hou, Stony Brook, NY (US); Rodney L. Miller, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 619 days.

(21) Appl. No.: 12/612,135

(22) Filed: Nov. 4, 2009

(65) Prior Publication Data

US 2011/0102642 A1    May 5, 2011

(51) Int. Cl.
*H04N 9/64* (2006.01)
*G06K 9/40* (2006.01)

(52) U.S. Cl. .................................. 348/248; 382/255
(58) Field of Classification Search .......... 348/78, 348/208.4, 241, 248, 208.6, 208.12, 208.13; 382/255, 275, 264
See application file for complete search history.

(56) References Cited

U.S. PATENT DOCUMENTS

| | | | |
|---|---|---|---|
| 3,971,065 A | 7/1976 | Bayer | |
| 4,876,591 A | 10/1989 | Muramatsu | |
| 6,011,875 A | 1/2000 | Laben et al. | |
| 6,097,835 A | 8/2000 | Lindgren | |
| 6,549,288 B1 | 4/2003 | Migdal et al. | |
| 7,239,342 B2 | 7/2007 | Kingetsu et al. | |
| 7,340,099 B2 | 3/2008 | Zhang | |
| 2006/0017837 A1 | 1/2006 | Sorek et al. | |
| 2006/0093234 A1* | 5/2006 | Silverstein | 382/255 |
| 2006/0187308 A1* | 8/2006 | Lim et al. | 348/208.4 |
| 2007/0046807 A1 | 3/2007 | Hamilton, Jr. et al. | |
| 2007/0223831 A1 | 9/2007 | Mei et al. | |
| 2008/0025627 A1* | 1/2008 | Freeman et al. | 382/255 |
| 2008/0240607 A1 | 10/2008 | Sun et al. | |
| 2009/0028451 A1 | 1/2009 | Slinger et al. | |
| 2010/0034429 A1 | 2/2010 | Drouin et al. | |
| 2010/0201798 A1* | 8/2010 | Ren et al. | 348/78 |
| 2010/0265316 A1 | 10/2010 | Sali et al. | |

FOREIGN PATENT DOCUMENTS

WO    2010/015086    2/2010

OTHER PUBLICATIONS

W. H. Richardson, "Bayesian-based iterative method of image restoration," Journal of the Optical Society of America, vol. 62, pp. 55-59, 1972.
L. B. Lucy, "An iterative technique for the rectification of observed distributions," Astronomical Journal, vol. 79, pp. 745-754, 1974.
Donatelli et al., "Improved image deblurring with anti-reflective boundary conditions and re-blurring," Inverse Problems, vol. 22, pp. 2035-2053, 2006.
Yuan, et al., "Progressive inter-scale and intra-scale non-blind image deconvolution," ACM Transactions on Graphics, vol. 27, Iss. 3, 2008.

(Continued)

*Primary Examiner* — Chieh M Fan
*Assistant Examiner* — Akshay Trehan
(74) *Attorney, Agent, or Firm* — Kevin E. Spaulding

(57) ABSTRACT

A method for determining a deblurred image comprising: receiving a blurred image of a scene; receiving a blur kernel; initializing a candidate deblurred image; determining a plurality of differential images representing differences between neighboring pixels in the candidate deblurred image; determining a combined differential image by combining the differential images; repeatedly updating the candidate deblurred image responsive to the blurred image, the blur kernel, the candidate deblurred image and the combined differential image until a convergence criterion is satisfied; and storing the final candidate deblurred image in a processor-accessible memory system.

18 Claims, 4 Drawing Sheets

OTHER PUBLICATIONS

Fergus et al., "Removing camera shake from a single photograph," ACM Transactions on Graphics, vol. 25, pp. 787-794, 2006.

Shan et al., "High-quality motion deblurring from a single image," ACM Transactions on Graphics, vol. 27, pp. 1-10, 2008.

Levin, et al., "Understanding and evaluating blind deconvolution algorithms," Proc. IEEE Conf. on Computer Vision and Pattern Recognition, 2009.

Rav-Acha, et al., "Two motion-blurred images are better than one," Pattern Recognition Letters, vol. 36, pp. 211-217, 2005.

Liu, et al., "Simultaneous image formation and motion blur restoration via multiple capture," Proc. International Conference Acoustics, Speech, Signal Processing, pp. 1841-1844, 2001.

Ben-Ezra, et al., "Motion deblurring using hybrid imaging," Proc. IEEE Conf. on Computer Vision and Pattern Recognition, vol. 1, pp. 657-664, 2003.

Rasker, et al., "Coded exposure photography: motion deblurring using fluttered shutter," ACM Transactions on Graphics, vol. 25, pp. 795-804, 2006.

Yuan et al., "Image deblurring with blurred/noisy image pairs," ACM Transactions on Graphics, vol. 26, Iss. 3, 2007.

Levin et al., "Image and depth from a conventional camera with a coded aperture," ACM Transactions on Graphics, vol. 26, Issue 6, 2007.

Anonymous CVPR submission, "Image Deconvolution using Multigrid Natural Image Prior," CVPR 2009 Submission, pp. 1-7.

A.N. Rajagopalan et al.: "An MRF Model-Based Approach to Simultaneous Recovery of Depth and Restoration From Defocused Images", IEEE Transactions on Pattern Analysis and Machine Intelligence, IEEE Service Center, Los Alamitos, CA, US, vol. 21, No. 7, Jul. 1, 1999, pp. 577-589, XP000832594, ISSN: 0162-8828, DOI: DOI: 10.1109/34.777369.

* cited by examiner

IMAGE DEBLURRING USING A COMBINED DIFFERENTIAL IMAGE

CROSS-REFERENCE TO RELATED APPLICATIONS

Reference is made to commonly assigned, co-pending U.S. Patent Application Publication No. 2011/0090378 published Apr. 21, 2011, entitled: "Image deblurring using panchromatic pixels", by Sen et al., and to commonly assigned, co-pending U.S. Patent Application Publication No. US20110090352 published Apr. 21, 2011, entitled: "Image deblurring using a spatial image prior", by Sen et al., both of which are incorporated herein by reference.

FIELD OF THE INVENTION

This invention pertains to the field of image deblurring and more particularly to a method for determining a deblurred image using a plurality of differential images.

BACKGROUND OF THE INVENTION

One common source of image blur in digital imaging is lens blur due to defocus and other aberrations in the optical system of the digital imaging device. Another common source of image blur is due to the relative motion between a camera and a scene during the exposure time (integration time) associated with image capture. This type of image blur is sometimes called "motion blur" or "smear." Motion blur typically occurs when the light level in the image capture environment is dim, thus necessitating a long exposure time.

One approach to reduce motion blur is to use an electronic flash to supplement the natural illumination. However, this is only effective when the subject is relatively close to the camera. Additionally, many users find that flash photography provides a less satisfactory experience.

Another approach to reducing the problem of motion blur is to improve the light sensitivity of electronic image sensors in order to reduce the exposure time during image capture. While much progress has been made in this area in recent years, the light sensitivity of currently available electronic image sensors is not high enough to prevent motion blur in many image capture environments.

One factor that reduces the light sensitivity of electronic image sensors is the use of color filters placed over the sensors to enable the formation of color images. For example, the well-known "Bayer pattern" taught in U.S. Pat. No. 3,971,065 to Bayer, teaches the use of a repeating array of red, green and blue color filters to detect color image signals. While this general approach is used today in most consumer digital cameras, the color filter array (CFA) has the undesirable effect of throwing away about ⅔ of the incident light, and therefore substantially reduces the photographic speed of the imaging system.

U.S. Pat. No. 4,876,591 to Muramatsu discloses an electronic imaging system that includes a beam-splitter and two different sensors, wherein one sensor has no color filters and the other sensor includes a pattern of color filters. The sensor without the color filters provides for increased light sensitivity, while the other sensor provides color information. Although this system improves the light sensitivity over a single conventional image sensor, the overall complexity, size, and cost of the system is greater due to the need for two sensors and a beam splitter. Furthermore, the beam splitter directs only half the light from the image to each sensor, limiting the improvement in photographic speed.

U.S. Patent Application Publication No. 2007/0046807 to Hamilton, et al., teaches a digital image system using a single sensor having some color image pixels with color filters and some panchromatic image pixels having no color filters. An interpolation algorithm is used to reconstruct a full-color image where the higher speed panchromatic image pixels provide the image detail information. While this approach can reduce motion blur to some extent by enabling shorter exposure times, there will still be some level of motion blur in many low-light imaging scenarios.

Another method to reduce the affect of motion blur in digital images is to use an image enhancement algorithm to compensate for blur in the captured image. Such algorithms are often referred to as "deblurring" or "deconvolution" algorithms. Such algorithms can be roughly classified into two categories: "blind" and "non-blind". If a blur kernel associated with the image blur is not known, then the problem is said to be "blind deconvolution," whereas when the blur kernel is known it is said to be "non-blind deconvolution."

For non-blind deconvolution, the most common technique is Richardson-Lucy (RL) deconvolution. (See the articles: W. H. Richardson, "Bayesian-based iterative method of image restoration," Journal of the Optical Society of America, Vol. 62, pp. 55-59, 1972, and L. B. Lucy, "An iterative technique for the rectification of observed distributions," Astronomical Journal, vol. 79, pp. 745-754, 1974.) This method involves the determination of a deblurred image (sometimes referred to as a "latent image") under the assumption that its pixel intensities conform to a Poisson distribution.

In the article "Improved image deblurring with anti-reflective boundary conditions and re-blurring" (Inverse Problems, Vol. 22, pp. 2035-2053, 2006), Donatelli et al. use a Partial Differential Equation (PDE)-based model to recover a deblurred image with reduced ringing by incorporating an anti-reflective boundary condition and a re-blurring step.

In the article "Progressive inter-scale and intra-scale non-blind image deconvolution" (ACM Transactions on Graphics, Vol. 27, Iss. 3, 2008), Yuan, et al. disclose a progressive inter-scale and intra-scale non-blind image deconvolution approach that significantly reduces ringing.

Blind deconvolution is an ill-posed problem, which is significantly more challenging. Approaches to pure blind deconvolution apply to either single blurred image or multiple blurred images. The most challenging problem is single-image blind deblurring, which requires the simultaneous estimation of the deblurred image and the Point Spread Function (PSF) associated with the image blur.

In the article "Removing camera shake from a single photograph" (ACM Transactions on Graphics, Vol. 25, pp. 787-794, 2006), Fergus et al. show that blur kernels are often complex and sharp. They teach an ensemble learning approach to recover a blur kernel, while assuming a certain statistical distribution for natural image gradients.

In the article "High-quality motion deblurring from a single image" (ACM Transactions on Graphics, Vol. 27, pp. 1-10, 2008), Shan et al. disclose a method for removing motion blur using a unified probabilistic model of both blur kernel estimation and unblurred image restoration.

In the article "Understanding and evaluating blind deconvolution algorithms" (Proc. IEEE Conf. on Computer Vision and Pattern Recognition, 2009), Levin, et al. described and evaluated a number of single-image blind deconvolution algorithms.

Having multiple blurred images can provide additional constraints to improve the deblurring process. In the article "Two motion-blurred images are better than one" (Pattern Recognition Letters, Vol. 36, pp. 211-217, 2005), Rav-Acha, et al. teach the use of images with different blurring directions to provide improved kernel estimation.

Recently, another type of blind deconvolution has been disclosed that employs additional information besides the blurred image to improve the deconvolution. This method can be categorized as "quasi-blind deconvolution." In the article "Simultaneous image formation and motion blur restoration via multiple capture" (Proc. International Conference Acoustics, Speech, Signal Processing, pp. 1841-1844, 2001), Liu, et al. teach using a CMOS sensor to capture multiple high-speed frames within a normal exposure time. Image pixels having motion blur are replaced with the pixels from one of the high-speed frames.

In the article "Motion deblurring using hybrid imaging" (Proc. IEEE Conf. on Computer Vision and Pattern Recognition, Vol. 1, pp. 657-664, 2003), Ben-Ezra, et al. disclose a hybrid camera that simultaneously captures a high-resolution image together with a sequence of low-resolution images that are temporally synchronized. With this method, optical flow is derived from the low-resolution images to estimate the global motion blur of the high-resolution image.

In the article "Coded exposure photography: motion deblurring using fluttered shutter" (ACM Transactions on Graphics, Vol. 25, pp. 795-804, 2006), Rasker, et al. disclose a "fluttered shutter" camera, which opens and closes the shutter during a normal exposure time with a pseudo-random sequence. The flutter changes the normal "box filter" to a broad-band filter that preserves high-frequency spatial details in the blurred image. As a result, the corresponding deconvolution becomes a well-posed problem.

In the paper "Image deblurring with blurred/noisy image pairs" (ACM Transactions on Graphics, Vol. 26, Issue 3, 2007), Yuan et al. have disclosed a method of image deblurring using blurred and noisy image pairs. Each image pair contains a blurred image captured with a long exposure time, and a noisy image captured with a short exposure time. The noise associated with the short exposure time image can be severe under low light condition, and therefore the deblurring results are highly depend on the performance of a denoising operation.

In the article "Image and depth from a conventional camera with a coded aperture" (ACM Transactions on Graphics, Vol. 26, Issue 6, 2007), Levin et al. employ a coded aperture to obtain an approximate blur kernel which can be used in a deblurring algorithm. This deblurring approach is limited to image blur caused by defocus.

SUMMARY OF THE INVENTION

The present invention represents a method for determining a deblurred image, the method implemented at least in part by a data processing system and comprising:

a) receiving a blurred image of a scene;
b) receiving a blur kernel;
c) initializing a candidate deblurred image;
d) determining a plurality of differential images representing differences between neighboring pixels in the candidate deblurred image;
e) determining a combined differential image by combining the differential images;
f) updating the candidate deblurred image responsive to the blurred image, the blur kernel, the candidate deblurred image and the combined differential image;
g) repeating steps d)-f) until a convergence criterion is satisfied; and
h) storing the final candidate deblurred image in a processor-accessible memory system.

This invention has the advantage that it produces deblurred images from a single blurred image without any knowledge about the precise nature of the blur kernel.

It has the additional advantage that it produces deblurred images having fewer ringing artifacts than prior art deblurring algorithms.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

Figure 1:
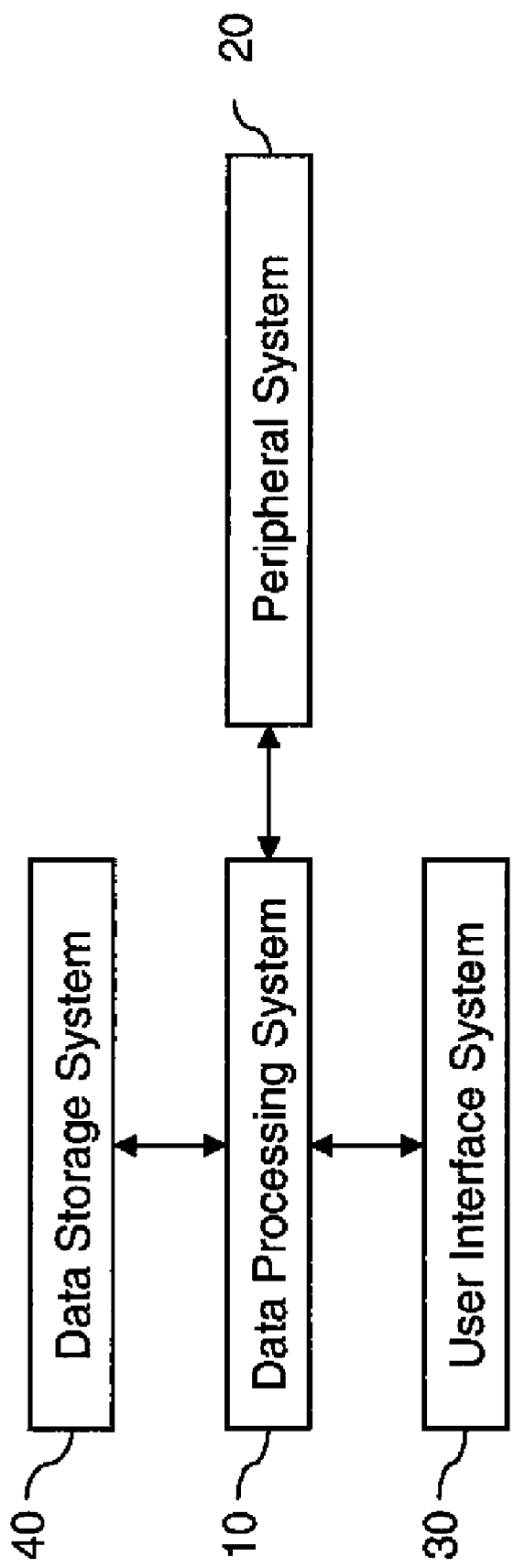
FIG. 1 is a high-level diagram showing the components of a system for classifying digital image according to an embodiment of the present invention.

FIG. 1 is a high-level diagram showing the components of a system for determining a deblurred image according to an embodiment of the present invention. The system includes a data processing system 10, a peripheral system 20, a user interface system 30, and a data storage system 40. The peripheral system 20, the user interface system 30 and the data storage system 40 are communicatively connected to the data processing system 10.

The data processing system 10 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 40 includes one or more processor-accessible memories configured to store information, including the information needed to execute the processes of the various embodiments of the present invention, including the example processes described herein. The data storage system 40 may be a distributed processor-accessible memory system including multiple processor-accessible memories communicatively connected to the data processing system 10 via a plurality of computers or devices. On the other hand, the data storage system 40 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 40 is shown separately from the data processing system 10, one skilled in the art will appreciate that the data storage system 40 may be stored completely or partially within the data processing system 10. Further in this regard, although the peripheral system 20 and the user interface system 30 are shown separately from the data processing system 10, one skilled in the art will appreciate that one or both of such systems may be stored completely or partially within the data processing system 10.

The peripheral system 20 may include one or more devices configured to provide digital content records to the data processing system 10. For example, the peripheral system 20 may include digital still cameras, digital video cameras, cellular phones, or other data processors. The data processing system 10, upon receipt of digital content records from a device in the peripheral system 20, may store such digital content records in the data storage system 40.

The user interface system 30 may include a mouse, a keyboard, another computer, or any device or combination of devices from which data is input to the data processing system 10. In this regard, although the peripheral system 20 is shown separately from the user interface system 30, the peripheral system 20 may be included as part of the user interface system 30.

The user interface system 30 also may include a display device, a processor-accessible memory, or any device or combination of devices to which data is output by the data processing system 10. In this regard, if the user interface system 30 includes a processor-accessible memory, such memory may be part of the data storage system 40 even though the user interface system 30 and the data storage system 40 are shown separately in FIG. 1.

Figure 2:
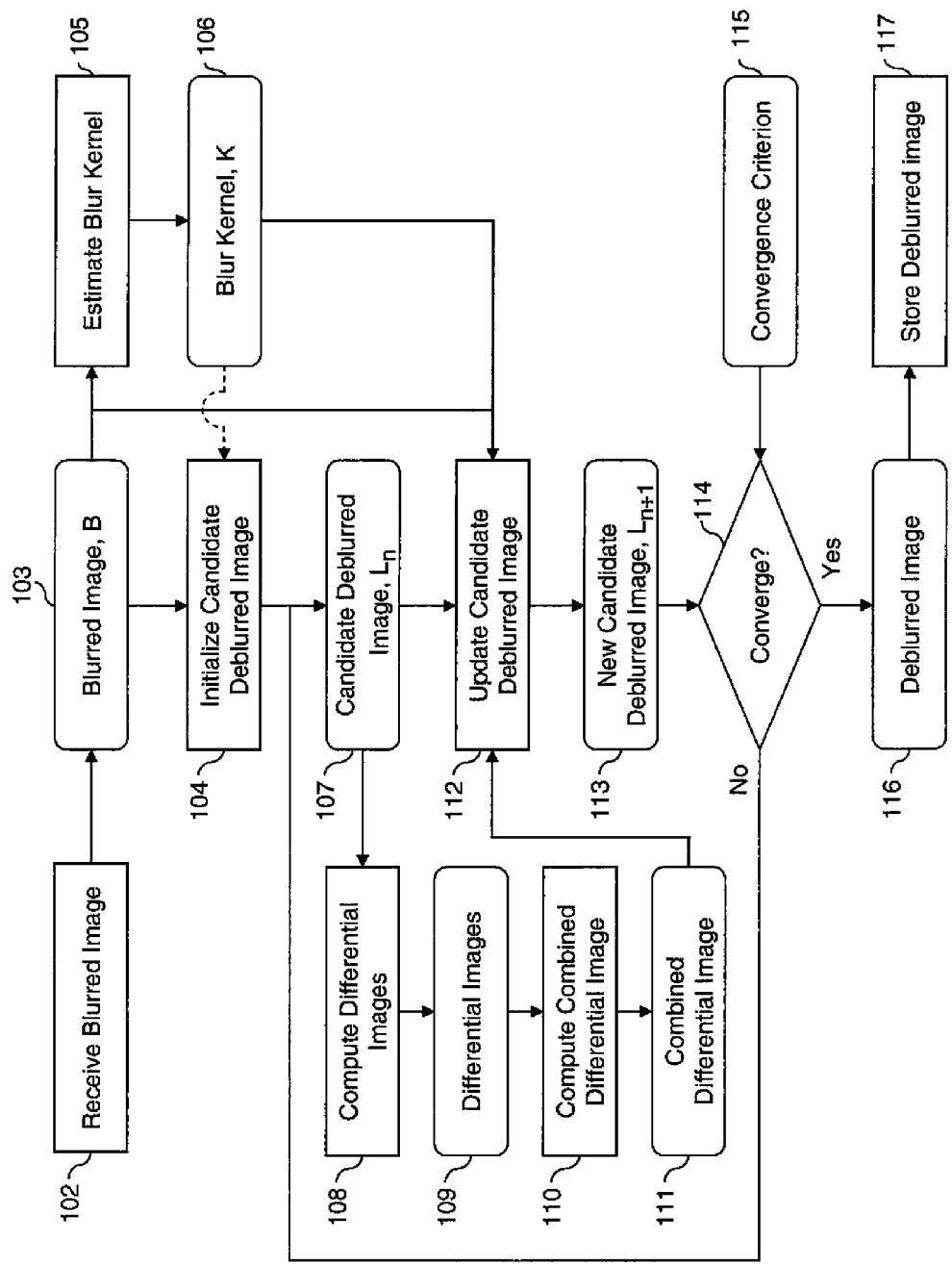
FIG. 2 is a flowchart for a preferred embodiment of the present invention.

The present invention will now be described with reference to FIG. 2. A receive blurred image step 102 is used to receive a blurred image 103 of a scene. Next an estimate blur kernel step 105 is used to determine a blur kernel 106 responsive to the blurred image 103. The blur kernel 106 is a convolution kernel that could be applied to a sharp image of the scene to produce an image having sharpness characteristics approximately equal to the blurred image 103.

Next an initialize candidate deblurred image step 104 is used to initialize a candidate deblurred image 107 using the blurred image 103. In a preferred embodiment of the present invention, the candidate deblurred image 107 is initialized by simply setting it equal to the blurred image 103. Optionally, any deconvolution algorithm known to those in the art can be used to process the blurred image 103 using the blur kernel 106. Examples of such deconvolution algorithms would include conventional frequency domain filtering algorithms such as the well-known Richardson-Lucy (RL) deconvolution method described in the background section.

Next a compute differential images step 108 is used to determine a plurality of differential images 109. The differential images 109 can include differential images computed by calculating numerical derivatives in different directions (e.g., x and y) and with different distance intervals (e.g., $\Delta x=1, 2, 3$). A compute combined differential image step 110 is used to form a combined differential image 111 by combining the differential images 109.

Next an update candidate deblurred image step 112 is used to compute a new candidate deblurred image 113 responsive to the blurred image 103, the blur kernel 106, the candidate deblurred image 107, and the combined differential image 111. As will be described in more detail later, in a preferred embodiment of the present invention, the update candidate deblurred image step 112 employs a Bayesian inference method using Maximum-A-Posterior (MAP) estimation.

Next, a convergence test 114 is used to determine whether the deblurring algorithm has converged by applying a convergence criterion 115. The convergence criterion 115 can be specified in any appropriate way known to those skilled in the art. In a preferred embodiment of the present invention, the convergence criterion 115 specifies that the algorithm is terminated if the mean square difference between the new candidate deblurred image 113 and the candidate deblurred image 107 is less than a predetermined threshold. Alternate forms of convergence criteria are well known to those skilled in the art. As an example, the convergence criterion 115 can be satisfied when the algorithm is repeated for a predetermined number of iterations. Alternatively, the convergence criterion 115 can specify that the algorithm is terminated if the mean square difference between the new candidate deblurred image 113 and the candidate deblurred image 107 is less than a predetermined threshold, but is terminated after the algorithm is repeated for a predetermined number of iterations even if the mean square difference condition is not satisfied.

If the convergence criterion 115 has not been satisfied, the candidate deblurred image 107 is updated to be equal to the new candidate deblurred image 113. If the convergence criterion 115 has been satisfied, a deblurred image 116 is set to be equal to the new candidate deblurred image 113. A store deblurred image step 117 is then used to store the resulting deblurred image 116 in a processor-accessible memory. The processor-accessible memory can be any type of digital storage such as RAM or a hard disk.

In one embodiment of the present invention, the blurred image 103 is captured using a digital camera. Alternately the blurred image 103 can be obtained using an image scanner, or can be a frame of a digital video.

Figure 3:
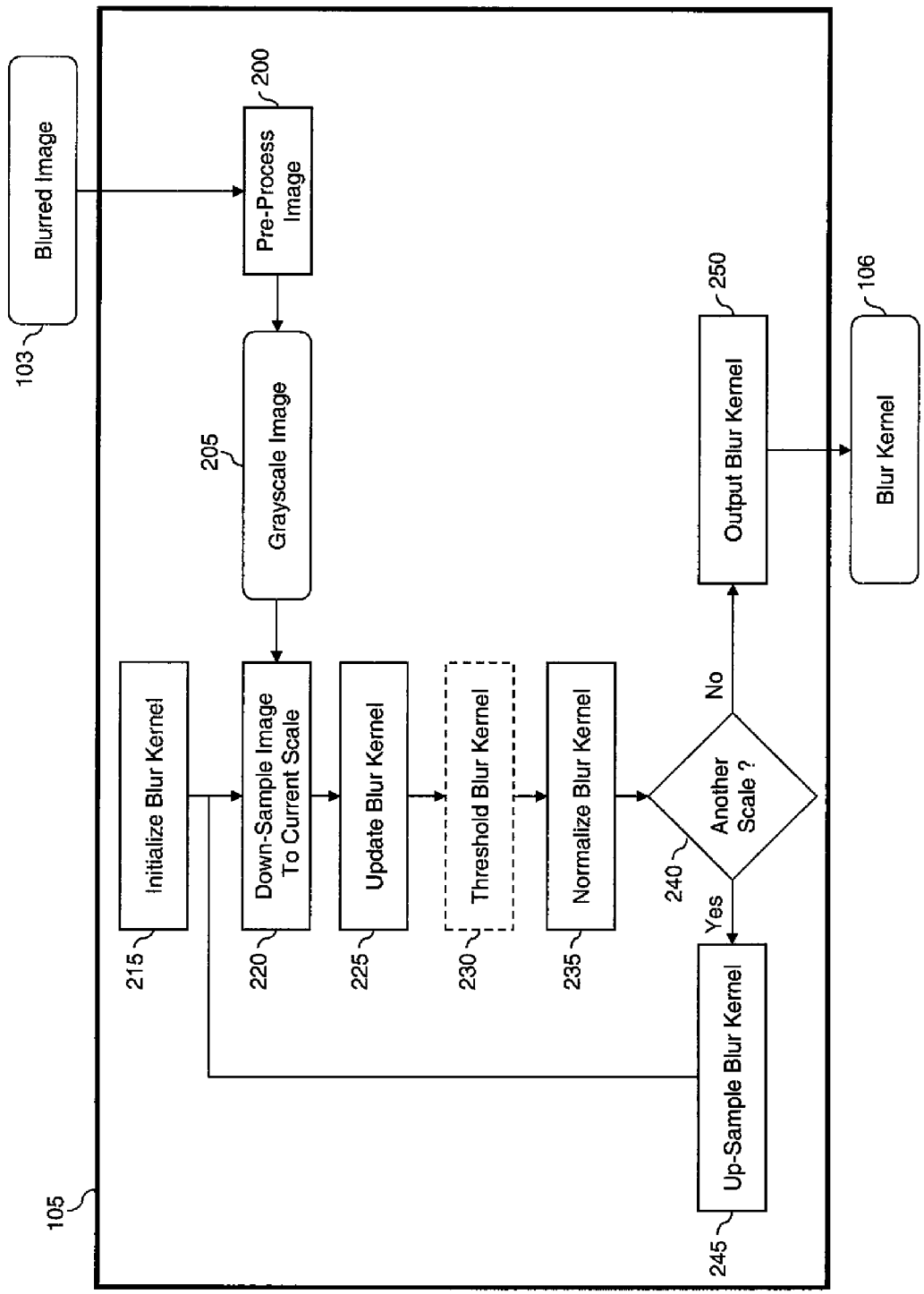
FIG. 3 is a flowchart showing additional details for the estimate blur kernel step in FIG. 2 according to a preferred embodiment of the present invention.

FIG. 3 shows a flow chart giving more details of the estimate blur kernel step 105 according to a preferred embodiment of the present invention. A pre-process images step 200 is used to compute a grayscale image 205 from the blurred image 103. Since the blur kernel 106 will generally be independent of the color channel, it is generally preferable to determine the blur kernel 106 using a grayscale version of the blurred image 103. The conversion from a color image to a grayscale image can be performed using any method known in the art. In a preferred embodiment of the present invention, the grayscale image is determined by performing a weighted summation of the color channels:

$$P = a_r R + a_g G + a_b B \quad (1)$$

where R, G and B are pixel values for the red, green and blue color channels of the blurred image 103, respectively, $a_r$, $a_g$ and $a_b$ are constants, and P is a pixel value of the grayscale image.

The pre-process images step 200 can also perform other functions in addition to converting the images to a grayscale format. For example, the pre-process images step 200 can apply a denoising algorithm to the blurred image 103 to reduce the noise level. There are many denoising algorithms that are well known in the art, such as median filtering algorithms.

The pre-process images step 200 can also be used to crop out a subset of the blurred image 103 to increase the computational efficiency. Preferably, an image region having significant image detail (high deviations of intensity) is selected since that is where the effect of the image blur will be most significant. Such an image region can be determined by applying a Laplacian operator to the blurred image 103 to form a Laplacian image, and then selecting a region of the Laplacian image having high signal levels. The selected image region can be a contiguous image region, such as a rectangular region of a particular size, or alternately, the selected image region can comprise a subset of image pixels scattered throughout the image, such as a neighborhoods of image pixels surrounding image pixels in the Laplacian image where the magnitude exceeds a predefined threshold. In an alternate embodiment of the present invention, the image region can be manually user-selected.

In a preferred embodiment of the present invention, the blur kernel 106 is determined with a Bayesian inference method using Maximum-A-Posterior (MAP) estimation. Using this method the blur kernel 106 is determined by defining an energy function of the form:

$$E(K, P_S) = (P_B - P_S \otimes K)^2 + \lambda_3 \|K\|_1. \quad (2)$$

where $P_B$ is the blurred grayscale image 205, $P_S$ is an estimate of a deblurred grayscale image, K is the blur kernel 106, $\lambda_3$ is a weighting factor, $\otimes$ is a convolution operator, $\|\cdot\|_1$ is 1-norm operator, $E(K, P_S)$ is the energy value, which is a function of the blur kernel and the estimate of the deblurred grayscale image. It can be seen that this energy function includes a first term that is a function of a difference between the blurred image ($P_B$) and a candidate blurred image determined by convolving the estimate of the deblurred grayscale image ($P_S$) with a candidate blur kernel (K).

In the preferred embodiment of the present invention, this MAP problem is solved by the well-known conjugate gradient method with alternating minimization to determine the blur kernel that minimizes the energy by alternately solving the partial differential equations (PDEs):

$$\frac{\partial E(K, P_s)}{\partial P_S} = 0, \text{ and } \frac{\partial E(K, P_s)}{\partial K} = 0 \quad (3)$$

For more information on solving PDEs using the conjugate gradient method, please refer to the aforementioned article "Image and depth from a conventional camera with a coded aperture" by Levin et al.

In a preferred embodiment of the present invention, a multi-scale approach is used based on a hierarchy of scaled images to avoid being trapped in local minimum during the optimization. With this multi-scale approach, an iterative process is used that sequentially optimizes an estimate of the blur kernel at a series of scales, starting with a coarse image scale. It has been found that using 2 or 3 different scales usually works well, where each scale differs by a factor of 2.

At the coarsest scale, an initialize blur kernel step 215 is used to initialize the blur kernel K as a square kernel of a predefined extent having equal elements. A down-sample image step 220 is used to down-sample the grayscale image 205 to the current scale. For example, if 3 scales are used, the first iteration would require a 4× down-sampling, the second iteration would require a 2× down-sampling, and the third iteration would use the full-resolution image.

Next, an update blur kernel step 225 is used to compute a new estimate of the blur kernel K by solving the PDEs given in Eq. (3) using the conjugate gradient method, where the blur kernel from the previous iteration is used as the initial guess for the PDE solution. The first PDE is solved to determine an estimate of a deblurred grayscale image $P_S$, and then the second PDE is solved to determine an updated estimate of the blur kernel K. An optional threshold blur kernel step 230 (shown with dashed lines) can be used to threshold small blur kernel elements (e.g. less than 0.1% of total energy) to reduce the noise of estimation. A normalize blur kernel step 235 is used to normalize the estimated blur kernel K so that the blur kernel elements sum to 1.0.

A test 240 is used to determine whether there are additional scales that need to be processed. If there are additional scales, the current estimate of the blur kernel is up-sampled to the next scale using an up-sample blur kernel step 245. This can be performed using any well-known interpolation technique such as bi-cubic interpolation. When there are no more scales left to process, an output blur kernel step 250 is used to output the final estimate of the blur kernel K as the blur kernel 106.

In an alternate embodiment of the present invention, the estimate of the deblurred grayscale image $P_S$ can be determined using other methods. For example, a second input image of the same scene can be captured with a shorter exposure time than was used for the blurred image 103. The image captured with the shorter exposure time will therefore have a lower level of motion blur. If motion blur is the primary source of the image blur for the blurred image 103, then the image captured with the shorter exposure time can serve as a good estimate of the deblurred image. The image captured with the shorter exposure time will generally have a significantly higher level of image noise; however this will not have a significant impact on the calculation of the blur kernel 106. In this case, the optimization process only needs to solve the second PDE given in Eq. (3) since the estimate of the deblurred grayscale image $P_S$ can be calculated directly from the image captured with the shorter exposure time. In some cases, it may be helpful to capture more than one additional image of the scene for use in determining the blur kernel 106. For example, multiple images with short exposure times can be captured and averaged to reduce the image noise.

Returning now to FIG. 2, in a preferred embodiment of the present invention, the deblurred image 116 is determined using a Bayesian inference method with Maximum-A-Posterior (MAP) estimation. Using the method, the deblurred image 116 is determined by defining an energy function of the form:

$$E(L)=(L \otimes K-B)^2+\lambda D(L) \qquad (4)$$

where L is the deblurred image 116, K is the blur kernel 106, B is the blurred image 103, $\otimes$ is the convolution operator, D(L) is the combined differential image 111 and $\lambda$ is a weighting coefficient In a preferred embodiment of the present invention the combined differential image 111 is computed using the following equation:

$$D(L) = \sum_j w_j (\partial_j L)^2 \qquad (5)$$

where j is an index value, $\partial_j$ is a differential operator corresponding to the $j^{th}$ index, $w_j$ is a pixel-dependent weighting factor which will be described in more detail later.

Figure 4:
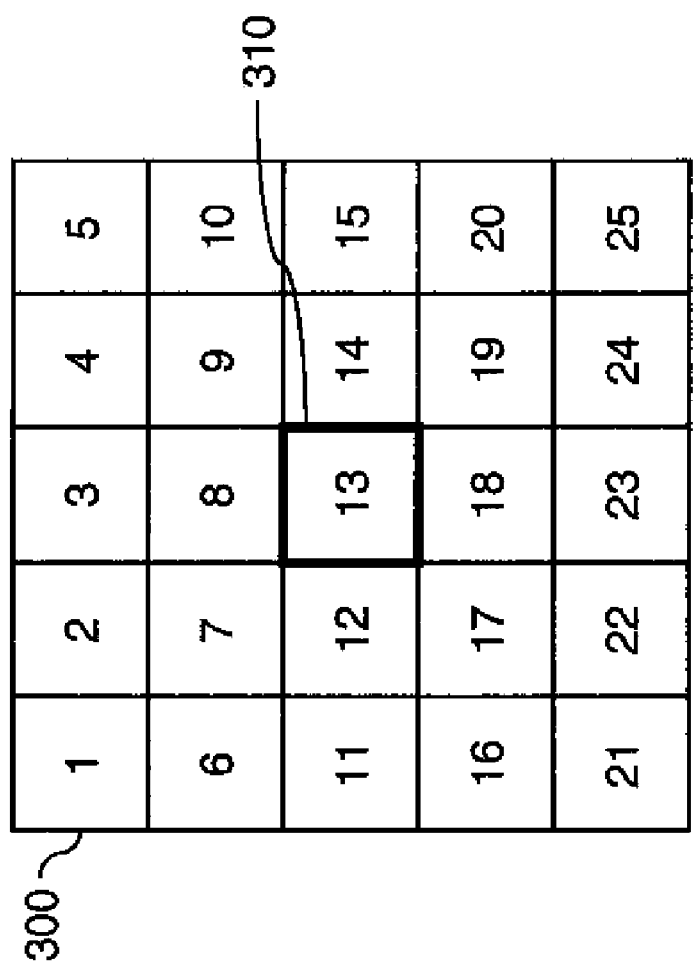
FIG. 4 shows an array of indices that can be used to determine the differential images.

The index j is used to identify a neighboring pixel for the purpose of calculating a difference value. In a preferred embodiment of the present invention difference values are calculated for a 5×5 window of pixels centered on a particular pixel. FIG. 4 shows an array of indices 300 centered on a current pixel location 310. The numbers shown in the array of indices 300 are the indices j. For example, an index value of j=6 corresponds top a pixel that is 1 row above and 2 columns to the left of the current pixel location 310.

The differential operator $\partial_j$ determines a difference between the pixel value for the current pixel, and the pixel value located at the relative position specified by the index j. For example, $\partial_6 S$ would correspond to a differential image determined by taking the difference between each pixel in the deblurred image L with a corresponding pixel that is 1 row above and 2 columns to the left. In equation form this would be given by:

$$\partial_j L = L(x,y) - L(x - \Delta x_j, y - \Delta y_j) \qquad (6)$$

where $\Delta x_j$ and $\Delta y_j$ are the column and row offsets corresponding to the $j^{th}$ index, respectively. At a minimum, it will generally be desirable for the set of differential images $\partial_j L$ to include one or more horizontal differential images representing differences between neighboring pixels in the horizontal direction and one or more vertical differential images representing differences between neighboring pixels in the vertical direction, as well as one or more diagonal differential images representing differences between neighboring pixels in a diagonal direction.

In a preferred embodiment of the present invention, the pixel-dependent weighting factor $w_j$ is determined using the following equation:

$$w_j = (w_d)_j (w_p)_j \qquad (7)$$

where $(w_d)_j$ is a distance weighting factor for the $j^{th}$ differential image, and $(w_p)_j$ is a pixel-dependent weighting factor for the $j^{th}$ differential image.

The distance weighting factor $(w_d)_j$ weights each differential image depending on the distance between the pixels being differenced:

$$(w_d)_j = G(d) \qquad (8)$$

where $d=\sqrt{\Delta x_j^2 + \Delta y_j^2}$ is the distance between the pixels being differenced, and $G(\cdot)$ is weighting function. In a preferred embodiment, the weighting function $G(\cdot)$ falls off as a Gaussian function so that differential images with larger distances are weighted less than differential images with smaller distances.

The pixel-dependent weighting factor $(w_p)_j$ weights the pixels in each differential image depending on their magnitude. For reasons discussed in the aforementioned article "Image and depth from a conventional camera with a coded aperture" by Levin et al., it is desirable for the pixel-dependent weighting factor w to be determined using the equation:

$$(w_p)_j = |\partial_j L|^{\alpha-2} \qquad (9)$$

where $|\cdot|$ is the absolute value operator and $\alpha$ is a constant (e.g., 0.8). During the optimization process, set of differential images $\partial_j L$ can be calculated for each iteration using the estimate of L determined for the previous iteration.

The first term in the energy function given in Eq. (4) is an image fidelity term. In the nomenclature of Bayesian inference, it is often referred to as a "likelihood" term. It can be seen that this term will be small when there is a small difference between the blurred image 103 (B) and a blurred version of the candidate deblurred image (L) which as been convolved with the blur kernel 106 (K).

The second term in the energy function given in Eq. (4) is an image differential term. This term is often referred to as an "image prior." The second term will have low energy when the magnitude of the combined differential image 111 is small. This reflects the fact that a sharper image will generally have more pixels with low gradient values as the width of blurred edges is decreased.

The update candidate deblurred image step 112 computes the new candidate deblurred image 113 by minimizing the energy function given in Eq. (4) using optimization methods that are well known to those skilled in the art. In a preferred embodiment of the present invention, the optimization problem is formulated as a PDE given by:

$$\frac{\partial E(L)}{\partial L} = 0. \qquad (7)$$

which can be solved using conventional PDE solvers. In a preferred embodiment of the present invention, a PDE solver is used where the PDE is converted to a linear equation form that can be solved using a conventional linear equation solver, such as a conjugate gradient algorithm. For more details on solving PDE solvers, refer to the aforementioned article "Image and depth from a conventional camera with a coded aperture" by Levin et al. It should be noted that even though the combined differential image 111 is a function of the deblurred image L, it is held constant during the process of computing the new candidate deblurred image 113. Once the new candidate deblurred image 113 has been determined, it is used in the next iteration to determine an updated combined differential image 111.

The method of the present invention can be applied to any type of digital imaging system. In a preferred embodiment of the present invention, the method is implemented as part of a digital still camera system. The method may be implemented by a processor in the digital still camera, or alternately may be implemented wholly or in part by a processor external to the digital still camera, such as a personal computer. The method of the present invention can also be used to process frames of digital videos.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

10 Data processing system
20 Peripheral system
30 User interface system
40 Data storage system
102 Receive blurred image step
103 Blurred image
104 Initialize candidate deblurred image
105 Estimate blur kernel step
106 Blur kernel
107 Candidate deblurred image
108 Compute differential images step
109 Differential images
110 Compute combined differential image step
111 Combined differential image
112 Update candidate deblurred image step
113 New candidate deblurred image
114 Convergence test
115 Convergence criterion
116 Deblurred image
117 Store deblurred image step
200 Pre-process images step
205 Grayscale image
215 Initialize blur kernel step
220 Down-sample image step
225 Update blur kernel step
230 Threshold blur kernel step
235 Normalize blur kernel step
240 Test
245 Up-sample blur kernel step
250 Output blur kernel step
300 Array of indices
310 Current pixel location

The invention claimed is:

1. A method for determining a deblurred image, the method implemented at least in part by a data processing system and comprising:
   a) receiving a blurred image of a scene;
   b) receiving a blur kernel;
   c) initializing a candidate deblurred image;
   d) determining a plurality of differential images representing differences between neighboring pixels in the candidate deblurred image, wherein each pixel of a particular differential image is determined by computing a difference between the corresponding pixel in the candidate deblurred image and a nearby pixel in the candidate deblurred image at a predefined relative position, wherein each differential image is associated with a different predefined relative position;
   e) determining a combined differential image by combining the differential images;
   f) updating the candidate deblurred image responsive to the blurred image, the blur kernel, the candidate deblurred image and the combined differential image, wherein the candidate deblurred image is updated by using a Bayesian inference method that evaluates candidate deblurred images using an energy function that includes an image differential term which is a function of the combined differential image;
   g) repeating steps d)-f) until a convergence criterion is satisfied; and
   h) storing the final candidate deblurred image in a processor-accessible memory system.

2. The method of claim 1 wherein the blur kernel is determined from the blurred image.

3. The method of claim 2 wherein the blur kernel is determined by analyzing only a subset of the image pixels in the blurred image, wherein the subset is determined to contain significant image detail.

4. The method of claim 3 wherein the subset of the image pixels in the blurred image is selected by:
   determining a Laplacian image from the blurred image; and
   selecting the subset of image pixels in the blurred image by analyzing the Laplacian image to determine a subset of image pixels containing significant image detail.

5. The method of claim 1, wherein the blur kernel is determined based on analysis of one or more additional images captured of same scene.

6. The method of claim 5, wherein at least one of the additional images is an image captured with a shorter exposure time than the blurred image.

7. The method of claim 6, wherein the at least one of the additional images has a lower level of motion blur than the blurred image.

8. The method of claim 1 wherein the predefined relative position associated with each of the differential images is specified by a direction and distance interval between the neighboring pixels.

9. The method of claim 1 wherein the plurality of differential images include a horizontal differential image corresponding to a predefined relative position with a horizontal offset and a vertical differential image corresponding to a predefined relative position with a vertical offset.

10. The method of claim 1 wherein the energy function further includes:
   an image fidelity term which is a function of a difference between the blurred image and a candidate blurred image determined by convolving the candidate deblurred image with the blur kernel.

11. The method of claim 1 wherein the energy function is optimized using a conjugate gradient algorithm.

12. The method of claim 1 wherein the blurred image is captured using a digital camera.

13. The method of claim 12 wherein the blurred image has been blurred due to motion blur resulting from motion of the digital camera during the time that the blurred image was captured.

14. The method of claim 1 wherein the blurred image is a frame of a digital video.

15. The method of claim 1 wherein the combined differential image is determined by a weighted combination of functions of the differential images.

16. The method of claim 1 wherein the functions of the differential images are weighted by a distance weighting factor that depends on a distance between the pixels being differenced, and a pixel-dependent weighting factor that depends on pixel magnitudes in the differential images.

17. A digital camera system comprising:
- an image sensor for capturing an image of a scene;
- an lens system for imaging the scene onto the image sensor;
- a processor-accessible memory system; and
- a data processing system for performing the steps of:
  a) receiving a blurred image of a scene;
  b) receiving a blur kernel;
  c) initializing a candidate deblurred image;
  d) determining a plurality of differential images representing differences between neighboring pixels in the candidate deblurred image, wherein each pixel of a particular differential image is determined by computing a difference between the corresponding pixel in the candidate deblurred image and a nearby pixel in the candidate deblurred image at a predefined relative position, wherein each differential image is associated with a different predefined relative position;
  e) determining a combined differential image by combining the differential images;
  f) updating the candidate deblurred image responsive to the blurred image, the blur kernel, the candidate deblurred image and the combined differential image, wherein the candidate deblurred image is updated by using a Bayesian inference method that evaluates candidate deblurred images using an energy function that includes an image differential term which is a function of the combined differential image;
  g) repeating steps d)-f) until a convergence criterion is satisfied; and
  h) storing the final candidate deblurred image in the processor-accessible memory system.

18. A computer program product for determining a deblurred image comprising an executable software application stored in a non-transitory process readable medium for causing a data processing system to perform the steps of:
  a) receiving a blurred image of a scene;
  b) receiving a blur kernel;
  c) initializing a candidate deblurred image;
  d) determining a plurality of differential images representing differences between neighboring pixels in the candidate deblurred image, wherein each pixel of a particular differential image is determined by computing a difference between the corresponding pixel in the candidate deblurred image and a nearby pixel in the candidate deblurred image at a predefined relative position, wherein each differential image is associated with a different predefined relative position;
  e) determining a combined differential image by combining the differential images;
  f) updating the candidate deblurred image responsive to the blurred image, the blur kernel, the candidate deblurred image and the combined differential image, wherein the candidate deblurred image is updated by using a Bayesian inference method that evaluates candidate deblurred images using an energy function that includes an image differential term which is a function of the combined differential image;
  g) repeating steps d)-f) until a convergence criterion is satisfied; and
  h) storing the final candidate deblurred image in a processor-accessible memory system.

* * * * *